United States Patent
Ruech et al.

(10) Patent No.: US 10,703,186 B2
(45) Date of Patent: Jul. 7, 2020

(54) BATTERY CARRIER FRAME AND METHOD FOR THE PRODUCTION THEREOF

(71) Applicant: Dura Automotive Holdings U.K., Ltd, Birmingham (GB)

(72) Inventors: Carsten Ruech, Spay (DE); Christian Schulte, Lennestadt (DE); Holger Rau, Reichshof (DE)

(73) Assignee: DURA OPERATING, LLC, Auburn Hills, MI (US)

(*) Notice: Subject to any disclaimer, the term of this patent is extended or adjusted under 35 U.S.C. 154(b) by 0 days.

(21) Appl. No.: 16/010,771

(22) Filed: Jun. 18, 2018

(65) Prior Publication Data

US 2018/0361876 A1    Dec. 20, 2018

(30) Foreign Application Priority Data

Jun. 19, 2017  (EP) .................................. 17176644

(51) Int. Cl.
  *B60K 1/04*   (2019.01)
  *H01M 2/10*   (2006.01)
  *B60L 50/64*  (2019.01)

(52) U.S. Cl.
  CPC ............... *B60K 1/04* (2013.01); *B60L 50/64* (2019.02); *H01M 2/1077* (2013.01); *H01M 2/1083* (2013.01); *H01M 2220/20* (2013.01)

(58) Field of Classification Search
  CPC .......... B60L 50/64; B60L 50/50; B60L 50/66; B60K 1/04; H01M 2/1077; H01M 2/1083; H01M 2220/20
  USPC ......................................................... 180/68.5
  See application file for complete search history.

(56) References Cited

U.S. PATENT DOCUMENTS

| | | | |
|---|---|---|---|
| 7,507,499 B2* | 3/2009 | Zhou ....................... | B60R 16/04 |
| | | | 429/96 |
| 8,268,469 B2* | 9/2012 | Hermann ............ | H01M 2/1077 |
| | | | 429/62 |
| 10,112,563 B2* | 10/2018 | Ashraf .................... | B60R 19/34 |
| 2018/0186227 A1* | 7/2018 | Stephens ............. | H01M 2/1083 |

* cited by examiner

*Primary Examiner* — John D Walters
(74) *Attorney, Agent, or Firm* — Vivacqua Law PLLC

(57) ABSTRACT

In the case of a battery support frame for an electric vehicle battery, said support frame being optimized in terms of tightness, compensation of component tolerances and load absorption in particular in the event of a crash, provision is made for a corner element to be arranged as tolerance compensation between a longitudinal profile and a transverse profile, the longitudinal profile and transverse profile being connected together via said corner element.

15 Claims, 3 Drawing Sheets

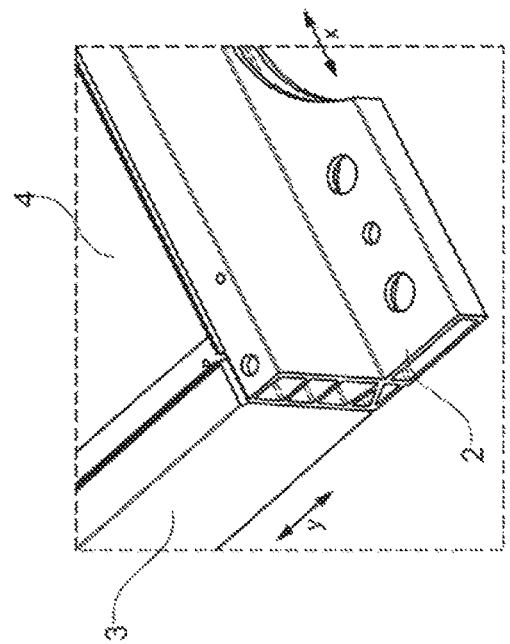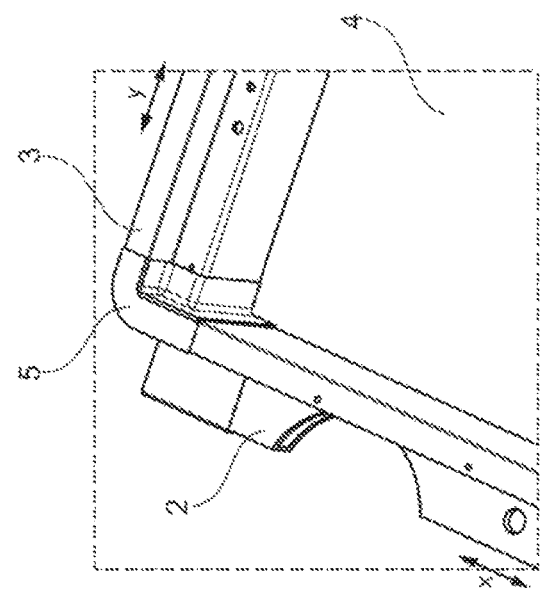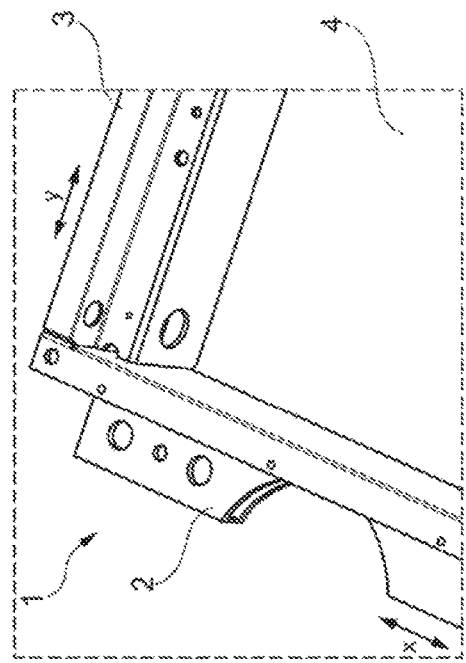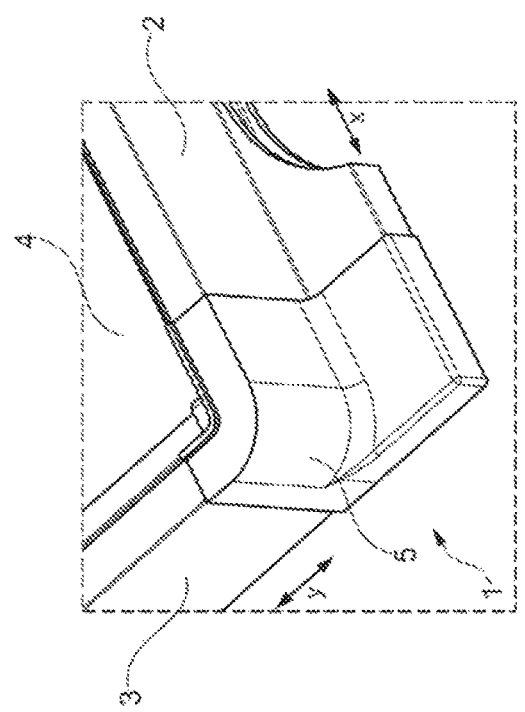

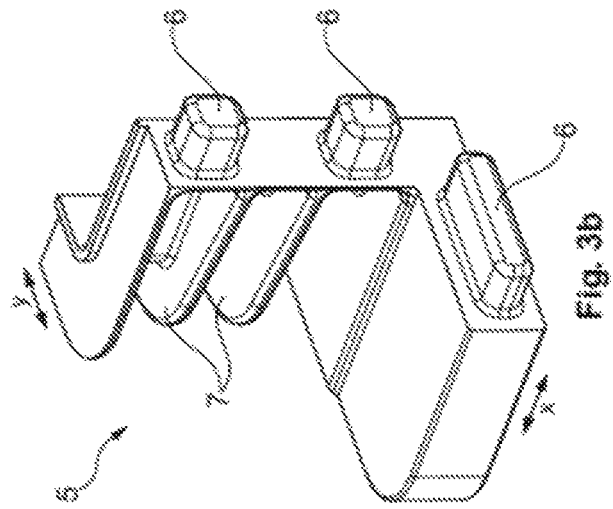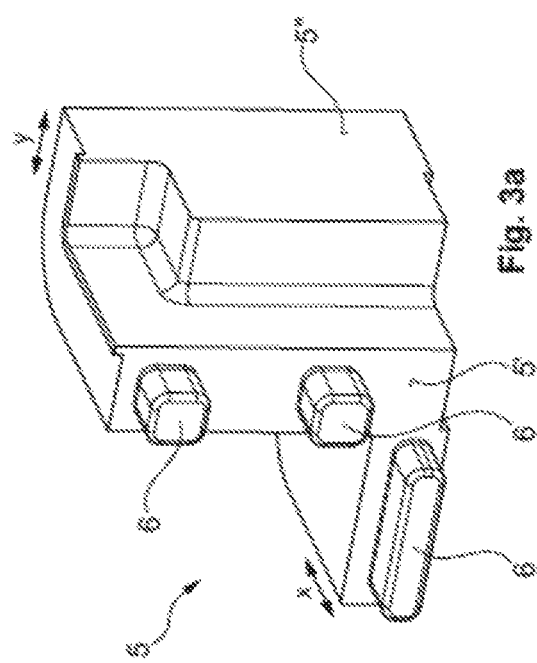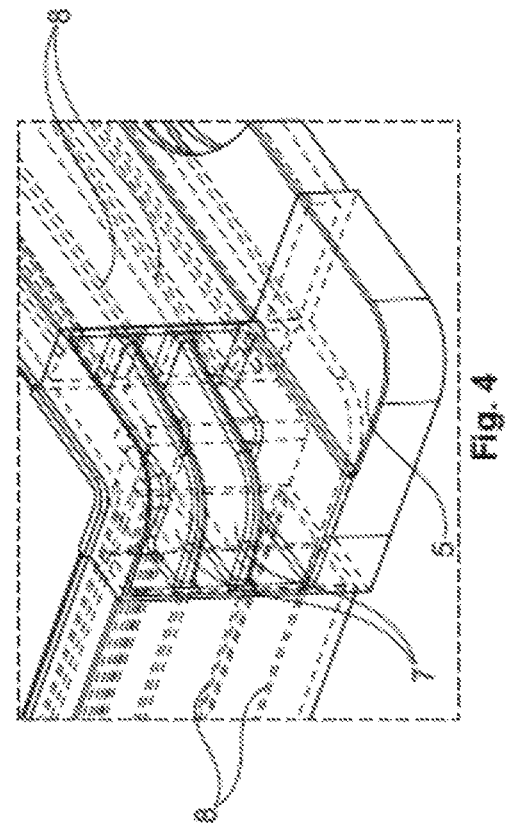

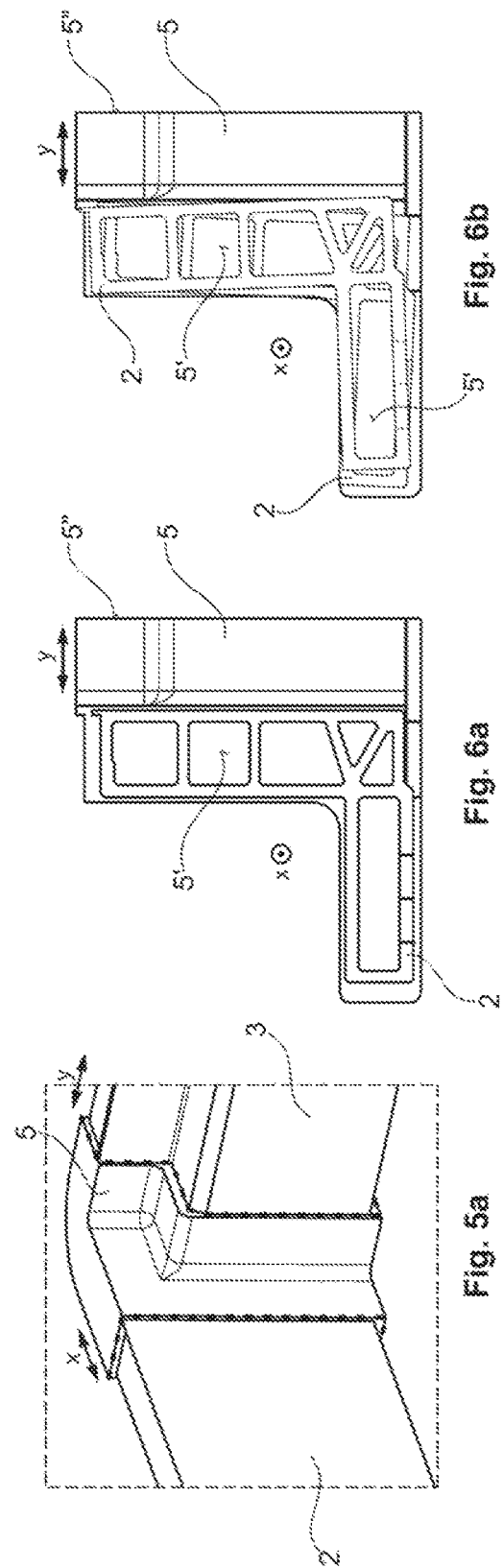
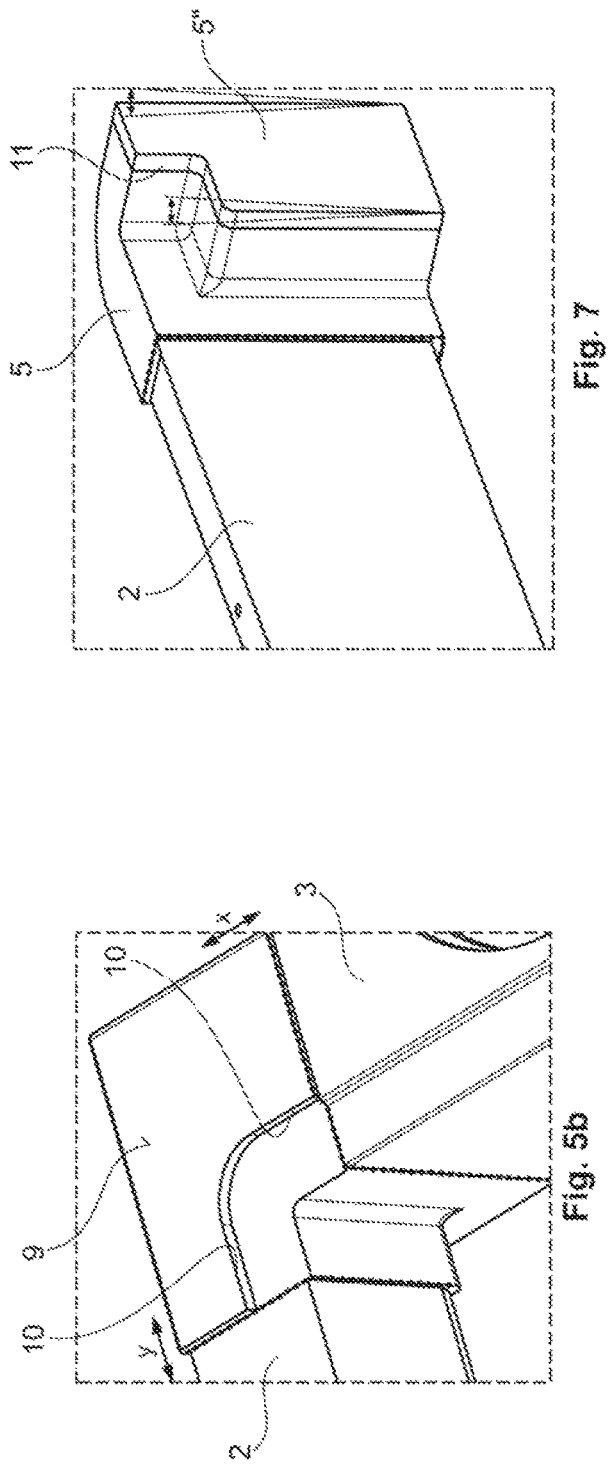

BATTERY CARRIER FRAME AND METHOD FOR THE PRODUCTION THEREOF

TECHNICAL FIELD

The invention relates to a support frame for an electric vehicle battery, in particular for electrically driven passenger cars.

BACKGROUND

In the context of this application, the term "battery" is used as a synonym for the entirety of an electrical energy store accommodated in a support frame, and therefore also obviously includes rechargeable batteries and an arrangement of a plurality of individual cells. The term "electric vehicle" includes in particular an electromotively driven passenger car and relates both to fully electrically driven cars and hybrid cars, i.e. ones which have a drive in which, depending on the drive concept and operating state, an electric motor and combustion engine are used jointly or alone to provide the drive energy.

Electric vehicles with a fully electric or at least partially electric or hybrid drive require—depending on the drive concept—the accommodation of batteries with a weight of up to several hundred kilograms. For the accommodation of the batteries in the vehicle, a number of aspects need to be taken into consideration.

The batteries should be arranged in a support structure that is sealed towards the outside, such that any leakage of a battery does not result in liquid escaping from the battery being able to pass into the environment. In terms of production, this demands that the support structure should form an at least downwardly sealed tray which prevents any escape of liquids under gravity in the event of damage (battery housing defect, accident, etc.). In addition, the support structure should be sealed from the outside to the inside, for instance in order to prevent moisture and/or dirt from passing from the outside into the interior of the battery carrier frame, which could in turn increase the risk of short-circuits or other functional impairments.

On account of the size of the batteries of modern electric vehicles, the support structures used for the batteries are increasingly also taking on structural tasks within the vehicle body. Therefore, a construction of a support structure accommodating the battery should take account not only of the forces that arise during driving and the interaction of the support structure with the rest of the body, but also in particular the loads that arise in the event of a crash.

Both of the abovementioned demands mean that the connection of the structural components from which the support structure accommodating the battery is constructed has to be sufficiently leak tight and stable. However, the metal profiles that are preferably used to produce the support structure have—not least on account of employed profile lengths of sometimes much more than one meter—dimensional deviations at the connecting points that are preferably to be joined in a cohesive manner (typically in the corner region of a frame), in particular twists which result in gaps or misalignment of the components to be connected in an order of magnitude, which, in particular in automated welding processes, but also during adhesive bonding operations and other cohesive connecting techniques, can cause problems in terms of strength and tightness of the connection and in process control and automation.

Therefore, it is desirable to provide a support frame for an electric vehicle battery, which is optimized in terms of tightness, compensation of component tolerances and load absorption in particular in the event of a crash, and can be welded readily in an automated manner. It is further desirable to provide a method for producing such a support frame.

SUMMARY

According to several aspects, a battery support frame for an electric vehicle is provided, having a longitudinal profile and having a transverse profile, wherein the support frame has a support frame corner forming an internal angle. A corner element is arranged as tolerance compensation between the longitudinal profile and transverse profile, the longitudinal profile and transverse profile being connected together via said corner element. The corner element can be configured in particular as a corner profile bridging the internal angle of the support frame.

In order to produce such a battery support frame, the following method steps are provided: placing either the longitudinal profile or the transverse profile against the corner element previously oriented with regard to the nominal position, with a deviation in nominal dimension, in particular profile torsion, of the longitudinal profile or of the transverse profile that exists in relation to the corner element being balanced out, connecting the longitudinal profile or transverse profile placed against the corner element to the corner element, placing the transverse profile or longitudinal profile that is not yet connected to the corner element against the corner element, and connecting the transverse profile or longitudinal profile that is not yet connected to the corner element to the corner element.

Alternatively, the following method steps can be provided: placing either the longitudinal profile or the transverse profile against the corner element and connecting the longitudinal profile or transverse profile placed against the corner element to the corner element, in particular regardless of any existing deviation in nominal dimension of the longitudinal profile or of the transverse profile that is transmitted to the corner element, machining a connecting face that is not yet connected to the longitudinal profile or transverse profile, with the deviation in nominal dimension that exists between the corner element and the longitudinal profile or transverse profile already connected to the corner element being balanced out, placing the transverse profile or longitudinal profile that is not yet connected to the corner element against the corner element, and connecting the transverse profile or longitudinal profile that is not yet connected to the corner element to the corner element.

The connecting of the longitudinal profile and of the transverse profile to the corner element preferably takes place via a welded joint. The corner element serves as a corner bridging part and is preferably a (die-)cast part or a forged part and is further preferably produced from a light metal alloy, in particular an aluminum alloy, and preferably as a solid material component. The longitudinal profile and transverse profile are preferably extruded profiles made of light metal alloys, in particular aluminum alloys. Preferably, the longitudinal profile and/or transverse profile are multi-chamber hollow profiles with internal webs. Of course, it is also possible for the longitudinal profile and/or transverse profile and/or corner element to be produced from an optionally fiber reinforced plastic material. In particular in such a case, provision can also be made for the different components to be joined by adhesive bonding.

As a result of the use of an additional corner element forming the support frame corner, said additional corner element being a separate component from the longitudinal profile and the transverse profile and being used to avoid the need to connect the transverse profile and longitudinal profile directly together, any dimensional deviations of the carrier profiles from the ideal nominal dimension, in particular twists or profile torsions, can be compensated and balanced out via the corner element. It is also possible for other deviations in nominal dimension, such as deviations from straightness, to be balanced out. The corner element forms a corner bridging component.

A further advantage is that the weld seams or adhesive bonds to be realized to connect the longitudinal and transverse profiles are shifted from the immediate corner region to locations that are more easily reachable and therefore the welds can be carried out in a more reliable manner with a better result in terms of load bearing capacity and tightness. With lower welding complexity in production terms, more highly loadable connecting points arise, which also satisfy the tightness demands made of the battery support frame in a highly reliable manner. Both the connection of the longitudinal profile to the corner element and the connection of the transverse profile to the corner element can be formed by a peripheral weld seam located in a welding plane.

In order for it to be possible to implement the above described advantages particularly readily, provision is made for the internal angle exhibited by the support frame corner to be formed by the corner element. Thus, the internal angle is formed by the corner element and not directly by the connection of the two profiles, and the longitudinal and transverse profiles are connected together, in a manner spaced apart from one another, only by the corner element.

It is considered to be advantageous when the corner element has a first end side with a first end side plane which faces an end side of the longitudinal member, and a second end side, at an angle (preferably an angle of 90°) to the first end side plane, with a second end side plane which faces an end side of the transverse member. In this way, the end side of the longitudinal member can be butted against the first end side plane of the corner element in order to be connected to the corner element and can subsequently be connected to the corner element, and/or the end side of the transverse member can be butted against the second end side plane of the corner element and subsequently connected thereto. The two end sides, at an angle to one another, of the corner element thus form the connecting faces preferably used for the preferably cohesive connection of the longitudinal profile or transverse profile to the corner element, and in the finished battery support frame, the end sides of the profiles can butt against the end side planes of the corner element. The weld seams provided for connection therefore preferably connect the longitudinal and transverse profile end sides to the end side planes of the corner element.

Provision can be made for one or more form fitting pegs to be arranged on the first end side of the corner element, said pegs projecting out of the first end side plane and penetrating into the end side of the longitudinal profile, and/or for one or more form fitting pegs to be arranged on the second end side of the corner element, said pegs projecting out of the second end side plane and penetrating into the end side of the transverse profile. This ensures that the corner element can penetrate into the longitudinal or transverse profile in a form fitting manner and thus, in particular in the event of a crash, in addition to the weld seams connecting the corner element and the longitudinal or transverse profile, a load path acting in a form fitting manner transversely to the profile longitudinal direction is furthermore produced by the form fitting pegs, said load path acting in particular when the weld seam fails or is highly deformed.

Provision is furthermore made for the longitudinal profile and/or the transverse profile to be a multi-chamber profile and to have internal webs which separate the internal chambers of the multi-chamber profile from one another, and for a plurality of formfitting pegs to be arranged on the first end side of the corner element and/or on the second end side of the corner element, said pegs penetrating into different internal chambers of the longitudinal profile or transverse profile facing said pegs.

In order, in spite of the use of formfitting pegs, to ensure tolerance compensation, provision is made for the formfitting peg(s) to be undersized compared with the internal dimension of the longitudinal profile or of the transverse profile or compared with internal dimensions of internal chambers, separated via internal webs, of the longitudinal profile or of the transverse profile in at least one direction, but preferably in both directions transversely to the longitudinal extent of the profiles. This makes it possible to twist the longitudinal or transverse profile, in spite of the engagement of formfitting pegs in the respective profile, with respect to the corner element at least to an extent that is required for tolerance compensation.

For further stabilization of the battery support frame, provision can be made for horizontally extending ribbing, having at least one reinforcing rib, that engages around the outside of the support frame corner to be provided on the corner element, wherein provision can in particular be made for the longitudinal profile and/or the transverse profile to be a multi-chamber profile and to have internal webs, and for the corner element to have at least one reinforcing rib that engages around the outside of the support frame corner, wherein the at least one reinforcing rib is arranged between a top side and an underside of the corner element at the level of an internal web of the longitudinal profile and/or of the transverse profile such that the reinforcing rib continues the relevant internal web of the longitudinal profile and/or of the transverse profile.

For further tolerance compensation after the corner element has already been connected to the longitudinal or transverse profile, provision can be be made for a machining allowance to be provided on that end side of the corner element that faces the longitudinal profile or that end side of the corner element that faces the transverse profile. If, for example, the corner element is already connected to the longitudinal profile and the precise position and/or orientation of the connecting face via which the corner element is intended to be connected to the transverse profile does not correspond to the nominal position or nominal orientation of the connecting face, the connecting face, which is formed in particular by the end face plane, facing the transverse profile, of the second end face of the corner element, can be adapted to the nominal position and/or nominal orientation by material removal. In particular, it is possible in this way to correct a misalignment of the connecting face, which can arise in that a deviation in nominal dimension that is transmitted from the longitudinal profile to the corner element is also transmitted to the connecting face.

In order to produce not only tightness of the support frame corner at the connecting points between the corner element and longitudinal or transverse profile, but also tightness of the support frame with respect to a base plate, provision can be made for that region of the support frame corner that is formed by the corner element, the longitudinal profile and the transverse profile to be finish machined on its underside after the longitudinal profile and transverse profile have been connected to the corner element. In this way, in particular a planar base plate can be connected to the support frame with a precise fit. Any remaining misalignments or weld seam protuberances that can have a disadvantageous effect on the tightness and load bearing capacity in the production of the connection of base plate and support frame, in particular in the region of the support frame corner, are eliminated reliably in this way.

The above described battery support frame and the method for the production thereof allow in particular a configuration of a battery support frame in which the longitudinal profile and the transverse profile are hollow chamber profiles, wherein the outwardly directed profile side of one of the two profiles and the inwardly directed profile side of the other of the two profiles can be the sealing profile side, while openings or bores can be provided in the respectively other profile side. In particular, there is no additional need for sealing of the profile end sides which are closed by the connection to the corner element.

Further features and advantages of the invention will become apparent from the following description of preferred exemplary embodiments with reference to the drawings.

DRAWINGS

In the drawings:

FIG. 1a/1b show the corner region of a conventional support frame for an electric vehicle battery in two different perspective views, FIG. 2a/2b show the corner region of a support frame for an electric vehicle battery, having a corner element inserted into the support frame corner, in two different perspective views, FIG. 3a/3b show a corner element for use in a support frame for an electric vehicle battery in two different perspective views, FIG. 4 shows a detail view of the corner element, connected to a longitudinal profile and a transverse profile, from FIG. 3a and FIG. 3b, FIG. 5a shows a view directed towards an internal corner formed by the corner element, FIG. 5b shows a view directed towards an internal corner formed by the corner element, FIG. 6a/6b show views directed in the x direction towards an end side of the corner element, with different imaginary positions of a longitudinal profile placed against the end side, and FIG. 7 shows an end side, facing in the y direction, of the corner element with material removal in the region of a machining allowance being indicated.

DETAILED DESCRIPTION

FIG. 1a and FIG. 1b show a corner region of a conventional battery support frame 1. A longitudinal profile 2 oriented with its longitudinal extent in the x direction (parallel to the direction of forward travel when driving straight ahead) is connected to a transverse profile 3 which extends in the y direction (transversely to the x direction and parallel to the road surface). The battery support frame 1, which is not fully illustrated in the figures, has at least two or a total of up to four corners configured in such a way and is preferably formed in a rectangular manner. On the underside of the longitudinal profile 2 and transverse profile 3, a base plate 4 is fastened to the frame.

The longitudinal profile 2 and transverse profile 3 are welded. The weld seam, which is not explicitly shown in the figures, extends, over a major part of its periphery, along an inner side face of the longitudinal profile 2 and, on account of the fact that an end side of the transverse profile 3 is butted against the side face, serving as a connecting face, of the longitudinal profile, is embodied as a fillet weld. The weld seam extends along the internal corner that arises immediately at the butt joint between the transverse profile and longitudinal profile.

In this construction, insufficient dimensional accuracy of the longitudinal profile 2 and/or of the transverse profile 3 has the result that, in the region of the connecting point that also forms the internal corner of the frame, irregular gaps form, which are not readily correctable but ultimately have to be bridged by the weld seam. In particular, the longitudinal profile can be inherently twisted by a longitudinal profile torsion. Such gaps result in turn in a much greater risk of insufficiently solid and leak tight weld seams and make reliable automated welding more difficult.

The construction also shows that the face required for the tightness of the battery support frame has to be the inwardly directed face of the longitudinal profile 2 and the outwardly directed face of the transverse profile 3, since the longitudinal profile 2 is a multi-chamber hollow profile that is open at its end side and an opening in the inner side of the longitudinal profile would inevitably entail a lack of tightness. The same applies similarly to the transverse profile, in the inwardly directed faces of which openings are provided, on account of which a further opening in the outwardly directed face would result in a lack of tightness of the battery support frame. Optional shifting of the sealing planes onto an inner or outer face of the profiles used is not readily allowed by this construction.

In order to remedy the above described problems, the battery support frame 1 according to FIGS. 2a and 2b provides, between the longitudinal profile 2 and transverse profile 3, a corner element 5 bridging the support frame corner. The profiles 2, 3 that are still connected by a single peripheral weld seam according to FIG. 1a and FIG. 1b can now be connected by means of two separate weld seams. The two peripheral weld seams are now arranged at a distance from the internal corner, which is reproduced by the corner element 5 itself, in two welding planes that are at an angle to one another, and are thus more easily reachable in particular for automated welding processes, and the welds can be carried out more reliably. The guarantee that the welds are sufficiently loadable and leak tight is increased.

Since, as a result of the corner element, the open end sides of both the longitudinal profile and the transverse profile can be closed in a leak tight manner, the system boundaries of the planes that peripherally seal off the battery support frame overall can be selected more freely by the designer.

In the case of the battery support frame 1 shown in FIG. 2a and FIG. 2b, too, a base plate 4 is connected to the support frame.

FIG. 3a and FIG. 3b show a further embodiment of a corner element 4 used to produce a battery support frame. The corner element 4, which is preferably a cast or forged part made of a light metal alloy, defines, with its end side directed in the x direction, an end face plane 5' from which three form fitting pegs 6 protrude in the x direction, said pegs 6 projecting into the longitudinal profile after the corner element 5 has been connected to the longitudinal profile 2. As a result of these formfitting pegs 6, it is possible, for example, in the case of an accident related deformation of the weld seam, for the form fitting pegs to support a load acting in the y direction, as is typical for a side impact, and to prevent any failure of the weld transversely to the x direction by passing, on the inside of the longitudinal profile, into supporting abutment against the side walls of the latter.

The end face plane 5' also forms the connecting face via which the longitudinal profile 2 is cohesively connected to the corner element 5, as is also apparent from FIGS. 5a and 5b, in which the weld seams are clearly indicated by dashed lines.

In a similar manner to the longitudinal profile 2, the transverse profile 3 is also connected to the corner element 5, wherein the end face, directed in the y direction, of the corner element defines an end face plane 5" which, in the exemplary embodiment shown in the figures, does not have any form fitting pegs but is configured in a planar manner. Having said that, form fitting pegs can also be provided on this end face directed in the y direction. Like the end face plane 5', the end face plane 5" also serves as a connecting face between the corner profile and the transverse profile placed against this end face plane.

FIG. 4 illustrates that a plurality of reinforcing ribs 7 are provided on the outside of the corner element 4, said ribs engaging around the outside of the corner element and thus of the support frame corner. As is apparent from the dashed illustration of internal webs 8 arranged within the longitudinal profile 2 and within the transverse profile 3, the reinforcing ribs 7 are positioned, in terms of their height, between the corner element top side and the corner element underside such that they continue the internal webs of the longitudinal profile and transverse profile. As a result, particularly effective load introduction from the profiles into the corner element and vice versa is achieved.

FIG. 5a clearly illustrates the routing of the weld seams for connecting the longitudinal profile 2 and transverse profile 3 to the corner element 5. With respect to the immediate internal corner of the battery support frame, the weld seams are transposed a short way away from the corner towards the inside (y direction) and towards the front or rear (x direction) and the connection is achieved via two peripheral weld seams which are both located within a welding plane. The welding plane of the weld seam connecting the longitudinal profile 2 to the corner element is in this case at an angle (preferably 90°) to the welding plane of the weld seam connecting the transverse profile to the corner element.

FIG. 5b shows the support frame corner in a perspective view from below. The support frame corner can have, in the face 9 that is directed downwards when used as intended, a fitting step 10 guided around the internal corner formed by the corner element, said fitting step 10 matching the edge profile of the base plate 4 to be connected, in particular to be welded, to the underside 9 of the corner element 5 (see also base plate 4 in FIG. 2a and FIG. 2b) and thus allowing the base plate to be fitted on the underside of the support frame 1 in a precise position. Furthermore, the underside 9, visible in FIG. 5b, of the support frame corner can, after the corner element has been connected to the longitudinal profile and the transverse profile, be finish machined in order to remove any irregularities such as welding beads or to correct any misalignments that result from dimensional inaccuracies. The fitting step 10 can in particular also be realized as part of such finish machining of the support frame corner underside.

FIG. 6a illustrates, by way of a cross section of the longitudinal profile 2 that is projected onto the end face plane 5', the ideal nominal abutment of the longitudinal profile against the corner element, which arises with perfect dimensional accuracy of the longitudinal profile. By contrast, FIG. 6b illustrates, in an exaggerated illustration, two actual abutments of the longitudinal profile against the corner element that often occur in practice and arise as a result of often unavoidable profile torsion of the longitudinal profile.

In order to avoid a situation in which this longitudinal profile torsion is transmitted to the transverse profile via the corner element when first the longitudinal profile and corner element are connected together and then the transverse profile is connected to the corner element, it is possible either to pre align the corner element such that the connecting face intended for connection to the transverse profile is oriented in a manner corresponding to the nominal orientation and to connect the longitudinal profile to the corner element even when it is in an actual abutment that does not correspond to the nominal abutment. Or, provision can be made for the longitudinal profile, in spite of any longitudinal profile torsion, to always be placed against the corner element and connected there to in the nominal abutment shown in FIG. 6a, wherein the twist of the longitudinal profile would then be transmitted to the transverse profile via the corner element if the corner element were not to be correctively finish machined at the connecting face 5" which is provided for connection to the transverse profile, so as to remedy the misalignment of this connecting face that does not correspond to the nominal orientation. To this end, a machining allowance 11, apparent from FIG. 7, can be provided on the corner element, said machining allowance 11 creating a material allowance that serves for subsequent correction of an orientation of the connecting face 5" that does not correspond to the nominal orientation. Calibration of the connecting face orientation is carried out by trimming of the connecting face, intended for connection to the transverse profile, sub sequent to the connection of the corner element to the longitudinal profile.

FIG. 6b furthermore illustrates, in conjunction with the form fitting pegs shown in FIG. 3b, that, in particular in the event that the longitudinal profile is not necessarily intended to be placed against the end face plane 5' in the abutment shown in FIG. 6a, the form fitting pegs should be undersized compared with the internal dimension of the profile or the internal dimensions of internal chambers of the multi chamber profile, in order for it to be possible to permit the twist, shown in FIG. 6b, of the profile with respect to the corner element.

Insofar as the production of the battery support frame has been described above with regard to a longitudinal profile torsion and to the effect that first of all the longitudinal profile is connected to the corner element and only then is the transverse profile connected to the corner element, it should be noted that a profile torsion can of course equally be present in the transverse profile and that the transverse profile can be connected to the corner element first of all and the above described steps of tolerance compensation can also be carried out with regard to the longitudinal profile.

LIST OF REFERENCE SIGNS

1 Battery support frame
2 Longitudinal profile
3 Transverse profile
4 Base plate
5 Corner element
5' End face plane, directed in the x direction, of the corner element
5" End face plane, directed in the y direction, of the corner element
6 Form fitting pegs
7 Reinforcing ribs 8 Internal webs
9 Downwardly directed face of the corner element
10 Fitting step
11 Machining allowance The following is claimed:

1. A battery support frame for an electric vehicle comprising:
   a longitudinal profile and a transverse profile, wherein the support frame has at least one support frame corner forming an internal angle;
   a corner element arranged as tolerance compensation between the longitudinal profile and the transverse profile, the longitudinal profile and the transverse profile being connected together via the corner element,
   wherein the longitudinal profile and/or the transverse profile is a multi-chamber profile and has internal webs, and the corner element has, on its outside, at least one reinforcing rib that engages around the outside of the corner element, wherein the at least one reinforcing rib is arranged between a top side and an underside of the corner element at the level of an internal web of the longitudinal profile and/or of the transverse profile such that the reinforcing rib continues the corresponding internal web of the longitudinal profile and/or of the transverse profile.

2. The battery support frame according to claim 1, wherein the support frame corner has an internal angle and the internal angle is formed by the corner element.

3. The battery support frame according claim 1, wherein the corner element has a first end side with a first end side plane which faces an end side of the longitudinal member, and a second end side, at an angle to the first end side plane, with a second end side plane which faces an end side of the transverse member.

4. The battery support frame according to claim 3, wherein the end side of the longitudinal member is placed against the first end side plane of the corner element, and/or the end side of the transverse member bears against the second end side plane of the corner element.

5. The battery support frame according to claim 3, further comprising one or more form fitting pegs arranged on a first end side of the corner element, the pegs projecting out of the first end side plane and penetrating into the end side of the longitudinal profile, and/or one or more form fitting pegs arranged on the second end side of the corner element, said pegs projecting out of the second end side plane and penetrating into the end side of the transverse profile.

6. The battery support frame according to claim 1 wherein the longitudinal profile and/or the transverse profile is a multi-chamber profile and has internal webs which separate the internal chambers of the multi-chamber profile from one another, and a plurality of form fitting pegs are arranged on a first end side of the corner element and/or on a second end side of the corner element, said pegs penetrating into different internal chambers of the longitudinal profile or the transverse profile facing the pegs.

7. The battery support frame according to claim 6 wherein the form fitting peg(s) is/are undersized compared with the internal dimension of the longitudinal profile or of the transverse profile or compared with internal dimensions of the internal chambers, separated via the internal webs, of the longitudinal profile or the transverse profile in at least one of a vehicle transverse direction and a vehicle longitudinal direction.

8. The battery support frame according to claim 1 further comprising ribbing, having at least one reinforcing rib, that engages around the support frame corner on an outside of the corner element.

9. The battery support frame according to claim 1 wherein a machining allowance is provided on that end side of the corner element that faces the longitudinal profile or that end side of the corner element that faces the transverse profile.

10. The battery support frame according to claim 1 wherein that region of the at least one support frame corner that is formed by the corner element, the longitudinal profile and the transverse profile is finish machined on the underside.

11. The battery support frame according to claim 1 wherein the longitudinal profile and the transverse profile are hollow chamber profiles, wherein an outwardly directed profile side of one of the two profiles and an inwardly directed profile side of the other of the two profiles is the profile side that seals the support frame towards the outside.

12. A battery support frame for an electric vehicle comprising:
    a longitudinal profile and a transverse profile, wherein the support frame has at least one support frame corner forming an internal angle;
    a corner element arranged as tolerance compensation between the longitudinal profile and the transverse profile, the longitudinal profile and the transverse profile being connected together via the corner element, the corner element having opposed connecting faces, wherein each of the longitudinal profile and the transverse profile is connected to the corner element by way of the opposed connecting faces,
    wherein one of the opposed connecting faces is in an actual abutment orientation deviating from a nominal abutment orientation, and
    wherein the other of the opposed connecting faces is oriented towards the respective other of the one of the longitudinal profile and the transverse profile in the nominal abutment orientation.

13. The battery support frame according to claim 12 wherein the longitudinal profile and/or the transverse profile is a multi-chamber profile and has internal webs, and the corner element has, on its outside, at least one reinforcing rib that engages around the outside of the corner element, wherein the at least one reinforcing rib is arranged between a top side and an underside of the corner element at the level of an internal web of the longitudinal profile and/or of the transverse profile such that the reinforcing rib continues the corresponding internal web of the longitudinal profile and/or of the transverse profile.

14. A battery support frame for an electric vehicle comprising:
    a longitudinal profile and a transverse profile, wherein the support frame has at least one support frame corner forming an internal angle;
    a corner element arranged as tolerance compensation between the longitudinal profile and the transverse profile, the longitudinal profile and the transverse profile being connected together via the corner element, the corner element having opposed connecting faces, wherein each of the longitudinal profile and the transverse profile is connected to the corner element by way of the opposed connecting faces,
    wherein one of the opposed connecting faces is in an orientation corresponding to the nominal abutment orientation and, wherein the other of the opposed connecting faces is correctively finish machined.

15. The battery support frame according to claim 14 wherein the longitudinal profile and/or the transverse profile is a multi-chamber profile and has internal webs, and the corner element has, on its outside, at least one reinforcing rib that engages around the outside of the corner element, wherein the at least one reinforcing rib is arranged between a top side and an underside of the corner element at the level of an internal web of the longitudinal profile and/or of the transverse profile such that the reinforcing rib continues the corresponding internal web of the longitudinal profile and/or of the transverse profile.

* * * * *